US010659250B2

(12) United States Patent
Corda et al.

(10) Patent No.: US 10,659,250 B2
(45) Date of Patent: May 19, 2020

(54) METHOD AND SYSTEM FOR MANAGING AN INTERNET CONNECTION AND INFORMING A USER ABOUT CONNECTIVITY

(75) Inventors: Enzo Corda, Turin (IT); Maria Moscatelli, Turin (IT); Marco Polano, Turin (IT)

(73) Assignee: Telecom Italia S.p.A., Milan (IT)

( * ) Notice: Subject to any disclaimer, the term of this patent is extended or adjusted under 35 U.S.C. 154(b) by 451 days.

(21) Appl. No.: 12/087,267

(22) PCT Filed: Dec. 30, 2005

(86) PCT No.: PCT/IT2005/000779
§ 371 (c)(1),
(2), (4) Date: Jul. 29, 2008

(87) PCT Pub. No.: WO2007/077583
PCT Pub. Date: Jul. 12, 2007

(65) Prior Publication Data
US 2009/0164611 A1 Jun. 25, 2009

(51) Int. Cl.
*H04L 12/28* (2006.01)
(52) U.S. Cl.
CPC ................. *H04L 12/2898* (2013.01)
(58) Field of Classification Search
CPC .... H04L 12/2898; H04M 7/0087; H04W 4/50
See application file for complete search history.

(56) References Cited

U.S. PATENT DOCUMENTS

| | | | | |
|---|---|---|---|---|
| 5,018,087 A | * | 5/1991 | Dannenberg | ..................... 702/96 |
| 5,751,965 A | * | 5/1998 | Mayo | .................. H04L 41/0213 |
| | | | | 709/224 |
| 5,832,303 A | * | 11/1998 | Murase et al. | .................. 710/36 |
| 5,852,722 A | * | 12/1998 | Hamilton | ...................... 709/221 |

(Continued)

OTHER PUBLICATIONS

Mamakos, et al., "A Method for Transmitting PPP Over Ethernet (PPPoE)", Network Working Group, Request for Comments: 2516, pp. 1-17, (Feb. 1999).

(Continued)

*Primary Examiner* — Azizul Choudhury
(74) *Attorney, Agent, or Firm* — Finnegan, Henderson, Farabow, Garrett & Dunner, L.L.P.

(57) ABSTRACT

A method is disclosed for managing an internet connection and informing a user about connectivity to the internet of a user terminal via a gateway, the gateway being connected to the user terminal via a local area network and to an internet service provider via a broadband line. The method includes: remotely provisioning through the first communication link the configuration of the gateway for internet connection; detecting completion of configuration of the gateway for internet connection in accordance with a service subscribed by the user, determining the state of the broadband line; and providing the user with a visual indication of availability of connectivity to the internet when configuration of the gateway for internet connection is completed and the broadband line is active; and managing the activation and deactivation of the connection to the internet by user terminals connected to a gateway via the local area network.

23 Claims, 4 Drawing Sheets

(56) References Cited

U.S. PATENT DOCUMENTS

| | | | | |
|---|---|---|---|---|
| 6,012,088 | A * | 1/2000 | Li et al. | 709/219 |
| 6,243,374 | B1 * | 6/2001 | White et al. | 370/352 |
| 6,314,512 | B1 * | 11/2001 | Branson et al. | 712/224 |
| 6,459,783 | B1 * | 10/2002 | March et al. | 379/211.02 |
| 6,671,730 | B1 * | 12/2003 | Akatsu et al. | 709/228 |
| 6,795,443 | B1 * | 9/2004 | Jeong et al. | 370/395.5 |
| 6,871,193 | B1 * | 3/2005 | Campbell | G06Q 20/102 |
| | | | | 705/40 |
| 6,934,774 | B1 | 8/2005 | Sundaram et al. | |
| 7,363,358 | B2 * | 4/2008 | Sullivan | 709/222 |
| 7,577,725 | B1 * | 8/2009 | Sitaraman | H04L 12/2872 |
| | | | | 709/219 |
| 7,702,801 | B1 * | 4/2010 | Kyle et al. | 709/229 |
| 7,937,484 | B2 * | 5/2011 | Julia et al. | 709/231 |
| 8,335,842 | B2 * | 12/2012 | Raji | G06Q 30/02 |
| | | | | 700/17 |
| 2001/0049730 | A1 * | 12/2001 | Brendes et al. | 709/223 |
| 2002/0078229 | A1 * | 6/2002 | Lindemann et al. | 709/238 |
| 2003/0025686 | A1 * | 2/2003 | Lee et al. | 345/204 |
| 2004/0071133 | A1 * | 4/2004 | Yusko et al. | 370/356 |
| 2004/0243712 | A1 * | 12/2004 | Sakai et al. | 709/227 |
| 2005/0108389 | A1 * | 5/2005 | Kempin | H04L 43/0811 |
| | | | | 709/224 |
| 2005/0135236 | A1 * | 6/2005 | Benson et al. | 370/225 |
| 2005/0165953 | A1 * | 7/2005 | Oba et al. | 709/238 |
| 2005/0198239 | A1 | 9/2005 | Hughes | |
| 2006/0182123 | A1 * | 8/2006 | Monette et al. | 370/395.53 |
| 2006/0227972 | A1 * | 10/2006 | Brok et al. | 380/270 |
| 2006/0233166 | A1 * | 10/2006 | Bou-Diab | H04L 63/08 |
| | | | | 370/389 |

OTHER PUBLICATIONS

Gross, et al., "PPP Over AAL5", Network Working Group, Request for Comments: 2364, pp. 1-12, (Jul. 1998).

Grossman, et al., "Multiprotocol Encapsulation over ATM Adaptation Layer 5", Network Working Group, Request for Comments: 2684, pp. 1-23, (Sep. 1999).

Laubach, "Classical IP and ARP over ATM", Network Working Group, Request for Comments: 1577, pp. 1-17, (Jan. 1994).

* cited by examiner

METHOD AND SYSTEM FOR MANAGING AN INTERNET CONNECTION AND INFORMING A USER ABOUT CONNECTIVITY

CROSS REFERENCE TO RELATED APPLICATION

This application is a national phase application based on PCT/IT2005/000779, filed Dec. 30, 2005.

TECHNICAL FIELD OF THE INVENTION

The present invention relates in general to a method and system for managing the Internet connection and informing a user about connectivity, and particularly to a method and system for informing a user about completion of configuration of a remotely configurable gateway and for managing the Internet connection via the gateway from a multi-terminal client premises network.

BACKGROUND ART

The activation and configuration of Internet access devices (e.g., routers/modems) and of added-value complex services is a very critical process for Internet Service Providers, who increasingly seek self-installing solutions and/or remote management in order to reduce as much as possible the operations that the users have to perform, and to avoid the presence of skilled staff for each Internet access device to be configured.

An automatic configuration process for an Internet access device is proposed in U.S. Pat. No. 6,012,088, which discloses an Internet access device that provides valuable features such as a router, firewall, e-mail gateway, web server, and other servers, and that uses an automatic configuration process to handle the task of configuring the Internet access device at a customer site for communication with the Internet. A not yet configured Internet access device is shipped directly to a customer without having to be manually configured first. The customer enters a registration identification number and a telephone number onto the Internet access device. The Internet access device then automatically connects to the Internet, downloads configuration data from a configuration server containing customer site specific configuration data, and then automatically configures itself for communication with the Internet. The Internet access device initially connects to the Internet through an Internet Service Provider over a standard analog telephone line using a standard modem and using a dynamic IP address. Once automatically configured, the Internet access device may then communicate with the Internet using any suitable connection including an analog telephone line, or a higher-speed line such as an ISDN line or a frame relay circuit, and is assigned a static IP address and a range of IP addresses for other devices on its local area network.

Another method for automatic configuration of home network computers solution is proposed in U.S. Pat. No. 5,852,722, which discloses a distributed computer network comprising of unconfigured network home client computers, and at least one autoconfiguration server. The network may also include sales servers and local service provider servers. The home network client computer determines, upon power on, if it possesses the requisite configuration information. If the requisite configuration information is lacking, the home network client computer sends a configuration request along with client computer identifying information to the autoconfiguration server. On receiving the configuration request from a home network client computer, the autoconfiguration server uses the client identifying information to determine the local service provider information and client computer specific data. The autoconfiguration server determines the local service provider information by looking up a directory of local service providers, the directory being stored on the autoconfiguration server or on some local service provider server. The autoconfiguration server determines the client computer specific data by accessing a database containing client computer information for each home network client computer, the database being stored either on the autoconfiguration server itself or on some sales server. The client computer specific data is stored in the database at time of sale/purchase/shipment of the home network computer to the user. The local service provider information and the client computer specific data is then downloaded to the requesting home network client computer. The home network client computer uses the configuration information downloaded by the autoconfiguration server to configure itself and establish connection to the local service provider.

OBJECT AND SUMMARY OF THE INVENTION

The Applicant has observed that when the Internet access device is remotely activated and configured by the Internet Service Providers via network systems (service provisioning), it may happen that the Internet service (data, voice, video) is not immediately available. In general, the provisioning process is activated when the Internet access device physically connects to the broadband line, and its duration depends upon the load of the network systems. During this time interval, it is of fundamental importance that the user should be correctly informed that the network systems are operating on the Internet access device and that consequently the Internet service is not yet available. The lack of information generates calls to the Customer Care, to signal, for example, that the service is not yet available, or else, in the worst of cases, to signal interruption of the provisioning process because the user has intervened on the Internet access device.

The Applicant has also observed that another critical aspect for Internet Service Providers is management of pay-per-use connections to the Internet in a multi-user environment. In such environments, it is complex and difficult to discriminate between the presence or absence of users that actually make use of the Internet services through their client applications. Simply checking the presence of traffic on the local network is not particularly indicative of the presence of traffic towards the Internet, because this is caused both by intra-client traffic (i.e., traffic only from/to clients of the local network) and by uncontrolled traffic generated, with increasing frequency, by software applications (e.g., to check on-line availability of new versions of the applications themselves).

The Applicant has further observed that the solutions described in U.S. Pat. Nos. 6,012,088 and 5,852,722 solve the problem of configuring an Internet access device and/or a computer, starting from the assumption of a constant and continuous availability of the Internet connection. However, these documents do not tackle the problem of managing the Internet connection by a local client, where many elements of the connection network are involved that can make connection unavailable. In such a situation of unavailability of the network connection, the solutions proposed in these documents do not provide the customers with information which would enable a better management of this resource.

The Applicant has yet further observed that the solutions described in U.S. Pat. Nos. 6,012,088 and 5,852,722 do not take into consideration aspects deriving from commercial offers by Internet Service Providers of pay-per-use Internet accesses, both in the general case and in the specific case of broadband lines. In particular, in this latter situation, keeping an Internet connection active and without direct control and perception by the customer is inexpedient in so far as it has an extremely marked impact from the billing standpoint at the customer end and from the standpoint of management of the relation at the Internet Service Provider end.

The objective of present invention is therefore to offer customers a reliable and simple system to control the state of the Internet connection and the corresponding costs, in particular to enable information regarding the provisioning step and hence the availability of the Internet services to be made available automatically and directly to the customer, without any possibility of modifying the configuration of the Internet access device, and to enable management and maintenance of the Internet connection only in case of actual use by the various customers, thus overcoming the problems arising when a user terminal is switched off without previously disconnecting from the Internet.

This objective is achieved by the present invention that relates to a method for managing an Internet connection and informing a user about connectivity to the Internet of a user terminal via a gateway, said gateway being connected to said user terminal via a first communication link, and to an Internet Service Provider via a second communication link, the method being characterized by:

- remotely provisioning through said first communication link the configuration of said gateway for Internet connection
- detecting completion of configuration of said gateway for Internet connection; and
- providing said user terminal with an indication of availability of connectivity to the Internet when configuration of said gateway for Internet connection is completed.

The present invention also relates to a system for managing an Internet connection and informing a user about connectivity to the Internet of a user terminal via a gateway, said gateway being connected to said user terminal via a first communication link, and to an Internet provider via a second communication link, the system being characterized in that said gateway and said user terminal are configured to implement the method according to any preceding claim.

Further aspects of the present invention relate to a customer-premises network including such a system, and software products, able, when loaded and run in a user terminal and a gateway connected to said user terminal via a first communication link, and to an Internet Service Provider via a second communication link, to cooperate in implementing the method of the present invention.

Further preferred aspects of the present invention are described in the dependent claims and in the following description.

In broad outline, the system of the present invention includes two different software applications, namely a client application provided in each user terminal, and a server application provided in the remotely configurable Internet access device. In particular, the server application provided in the Internet access device is always active, and is configured i) to communicate with each active client application that requests access to the Internet, ii) to access the configuration data of the Internet access device, iii) to send to the client applications information about provisioning and availability of the Internet connection, and iv) to manage connection to the Internet, both when requests of connection and disconnection are sent by the client applications and when disconnection occurs automatically in case of absence of users connected to the Internet.

The client application provided in each user terminal, instead, is configured to send to the server application commands for connection and disconnection to the Internet, based on which commands the Internet access device determines presence or absence of users connected to the Internet.

The system of the present invention provides automatically and directly each user with information about availability of the connection to the Internet when the remotely controlled provisioning phase has totally completed. When applied to multi-user environments with pay-per-use Internet accesses, the peculiarity of the system of the present invention enables management of the connection to the Internet and in particular maintenance thereof only in the case where the various user actually wish to make use thereof.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

Figure 1:
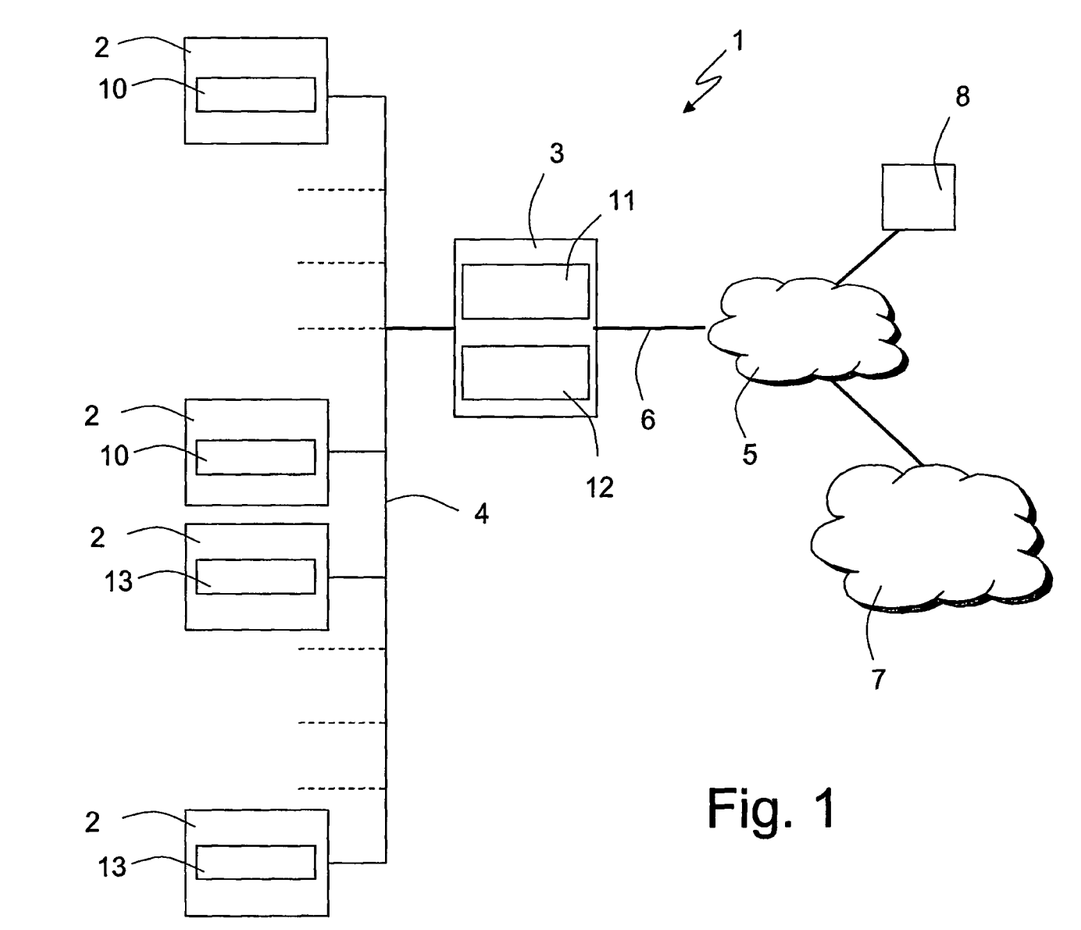
FIG. 1 shows a block diagram of a basic multi-client local area network architecture for access to Internet services.

FIG. 1 shows a block diagram of a multi-terminal customer-premises network, for example, a home network, including a number of user terminals 2, and a remotely configurable customer-premises equipment, for example a gateway 3 such as a modem/router, all so designed as to implement the present invention.

In particular, the gateway 3 is connected, on the one hand, to the user terminals 2 via a communication link defined by a local area network (LAN) 4, and, on the other hand, to an IP Network of an Internet Service Provider (ISP) 5 via a public communication network defined by a broadband communication link 6 managed by a telecommunication operator (that may be either the same as, or different than the Internet Service Provider). Via the IP Network, the gateway 3 guarantees access to the Internet 7 and to operational support systems (OSS) 8 of the Internet Service Provider, which are also dedicated to the provisioning processes.

Before its configuration, the gateway can operate as a modem linked with a management center of the Internet Service Provider. Advantageously, provisioning of the gateway configuration parameters for Internet connection takes place through a service session with a Network Access Server (NAS) of the Internet Service Provider (remote provisioning) activated on the link between the gateway and the management center. This service session can be based on one of the known communication protocols, e.g., PPPoE (described in RFC2516), PPPoA (described in RFC2364), Bridged Mode (described in RFC2684) or Classic IP (described in RFC1577). The gateway configuration parameters include those parameters that are needed for activating an Internet connection corresponding to the service profile subscribed by the user (e.g., a pay-per-use traffic profile using one of the above PPPoE communication protocol dedicated to the user connection). Once these configuration parameters are available on the gateway, the management center signals to the gateway itself the achievement of the new profile. The configuration parameters are then activated.

Each user terminal 2 may be connected to the gateway 3 via either a wired communication link (e.g., Ethernet, USB, etc.) or a wireless communication link (e.g., IEEE802.11, IEEE802.15, IEEE802.16, UMTS, etc.), and may share the communication link through which it is connected to the gateway 3 with other user terminals 2 or personal computers in an "all-IP" network. Therefore, two different user terminals 2 may be connected to the gateway 3 via the same communication link or via respective and different communication links.

The user terminal 2 may be of any type so designed as to run one of more software applications by means of which the user terminal 2 connects, via the gateway 3, to the Internet Service Provider and access corresponding services, typically including audio and/or video services. For example, the user terminal 2 may be an IP phone, a UMTS mobile phone, a set-top box, a personal computer, a portable media player, a pocket PC, etc. Besides that, each user terminal 2 may be provided with a display, on which the visual indication of completion of configuration of the gateway 3 and availability of connection to the Internet is provided.

According to an aspect of the present invention, there is also provided a system for informing the users, through the user terminals, about completion of configuration of the gateway 3 and of availability of a connection (typically, a dynamic connection) to the Internet 7 via the gateway 3.

In particular, the system includes a software application, hereinafter referred to as K-Con (Key-Connection & Configuration) client application 10 provided in each user terminal 2, and a corresponding software application, hereinafter referred to as K-Con server application 11, provided in the gateway 3 and configured to communicate with the K-Con client applications 10 of the user terminals 2 to implement the present invention. The gateway 3 is also provided with an embedded Web server 12. In FIG. 1 there are also shown user terminals 2 not provided with respective K-Con client applications 10 but simply with a standard Internet browser 13, which allows the users to gain access to information directly via the user interface of the Web server 12 of the gateway 3.

The K-Con server application 11 resident on the gateway 3 is always active and is designed to listen to and interact with the active K-Con client applications 10, and to collect and to send to the K-Con client applications 10 the following information:

state of the broadband line 6 (e.g., active, in synchronization, inactive, etc.);
progress state of and information about the provisioning/configuration of the gateway 3 (e.g., in progress, completed, traffic profile, service profile, information about a possible additional Smart Card of the gateway 3 or the like, etc.); and
state of and information about the logic connection to the Internet 7 (e.g., active, used by n users, inactive, etc.).

In the absence of any activity by the K-Con client applications 10, the K-Con server application 11 is also configured to close the connection to the Internet that may possibly be still active.

The K-Con client application 10 resident on each user terminal 2 is configured to communicate periodically with the K-Con server application 11 to communicate the intention of the customer to connect or to remain connected to the Internet 7, to be periodically updated with the various information of the gateway 3, and to make available to the customer the information published by the K-Con server application 11, including the state (active/inactive) of connection to the Internet 7, and the possible presence of other user terminals connected to the Internet 7, by means of a specific user interface, depending upon the type of user terminal 2, namely:

if the user terminal 2 is provided with a K-Con client application 10, the information is made available directly via the user interface of the user terminal 2;
if the user terminal 2 is not provided with a K-Con client application 10 but simply with a standard Internet browser 13, information is made available directly to the user via the user interface of the Web server 12 of the gateway 3.

User interfaces, in addition to displaying the aforementioned information, can also implement a specific mechanism to enable the user to manage (connect/disconnect) the connection to the Internet, which mechanism can be logically constrained to the actual availability of the connection (e.g., completion of the provisioning step and broadband line active) and, for example, to a pay-per-use traffic profile.

Figure 2:
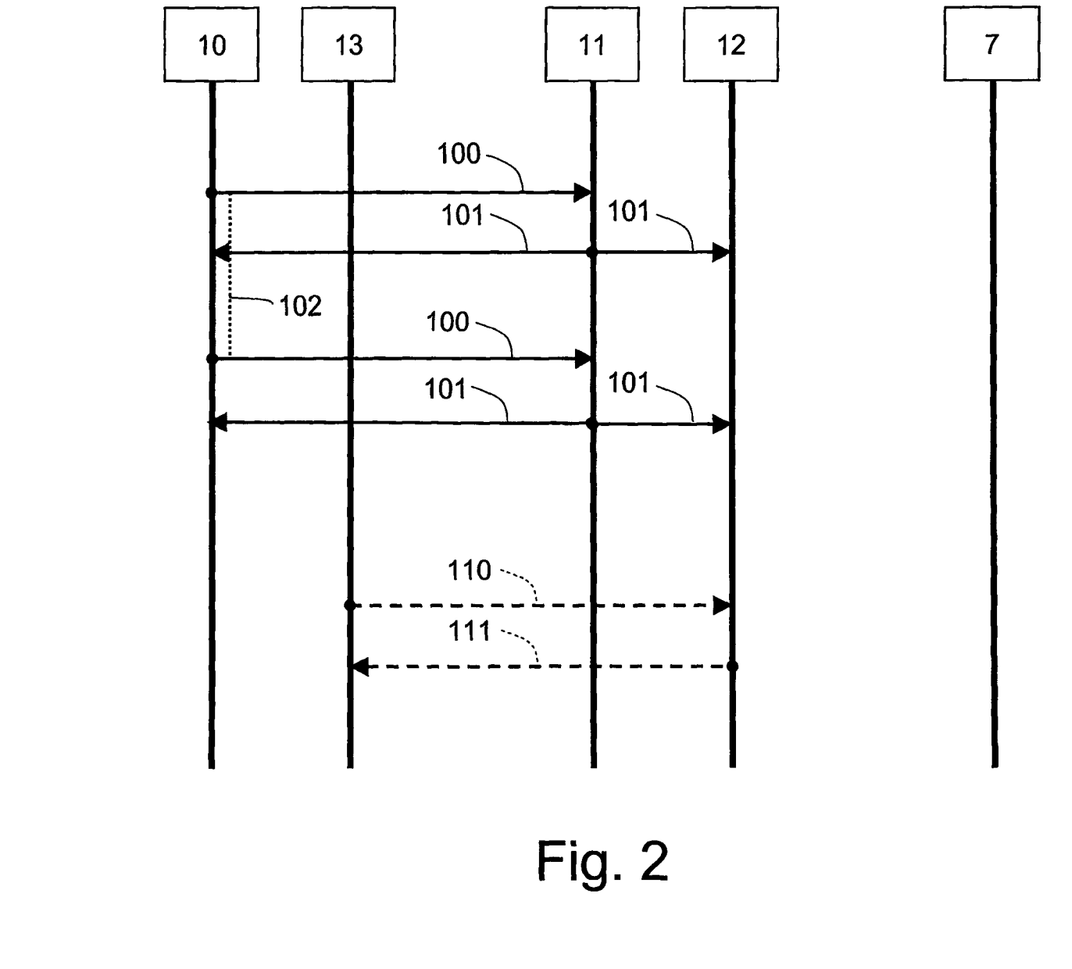
FIG. 2 shows a workflow of messages and events in FIG. 1 related to a keep-alive procedure.
Figure 3:
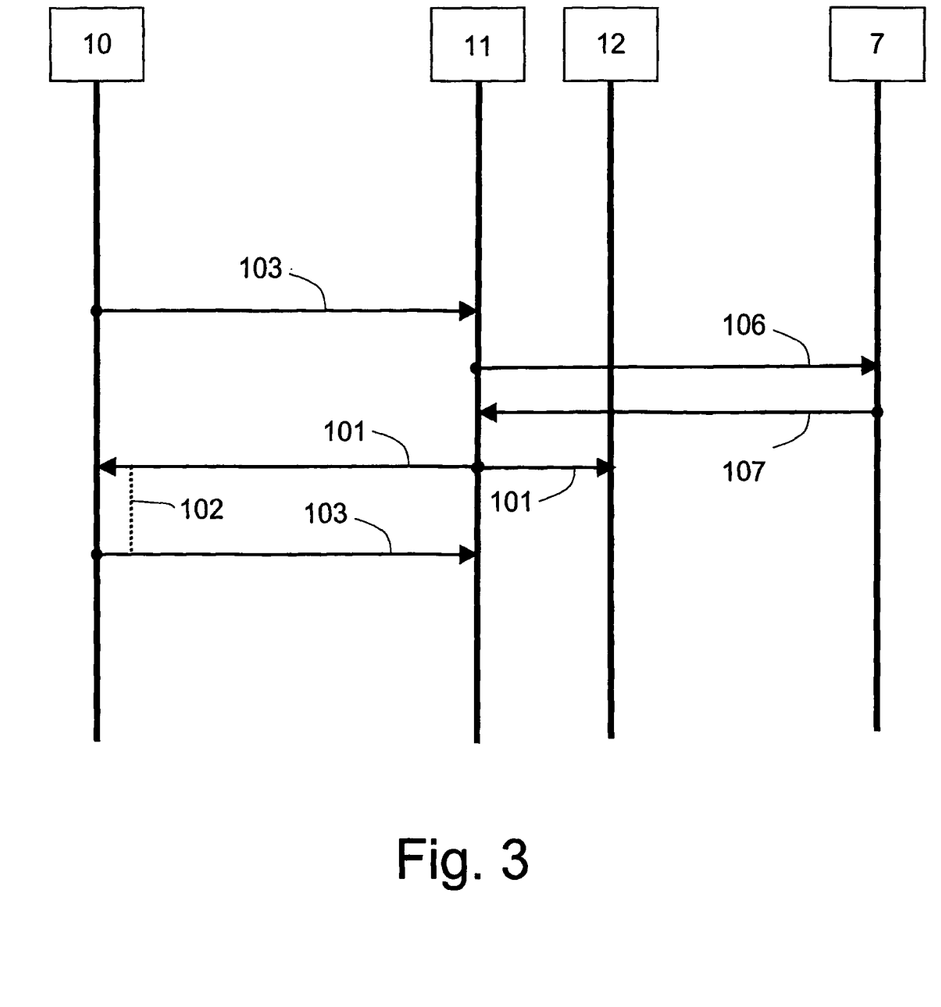
FIG. 3 shows a workflow of messages and events in FIG. 1 related to connection to the Internet.
Figure 4:
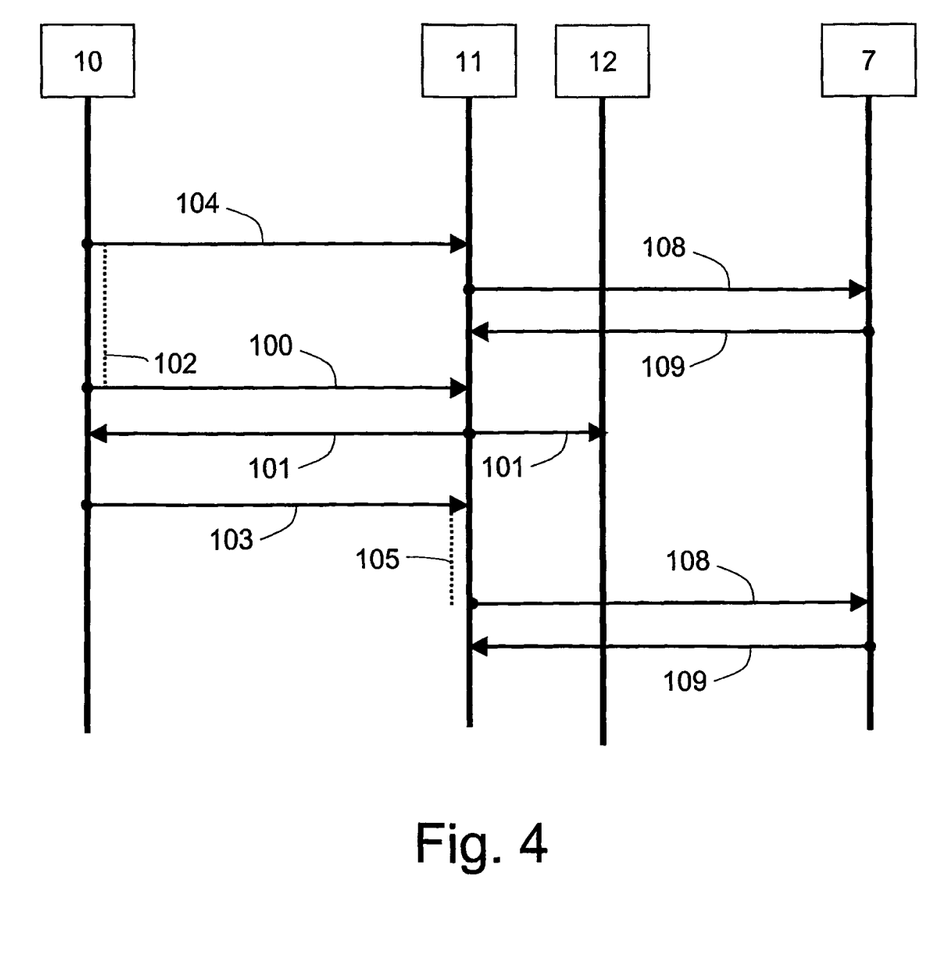
FIG. 4 shows a workflow of messages and events in FIG. 1 related to disconnection from the Internet.

FIGS. 2, 3 and 4 show workflows of messages, of interactions and of significant events between the K-Con client application 10 and the K-Con server application 11 in the system of the present invention, wherein the K-Con client application 10 is always active with the task of starting the interaction with the K-Con server application 11, while the K-Con server application 11, at start-up, is only listening to messages from K-Con client applications 10, and responds to each message received from K-Con Client application 10.

In particular, FIG. 2 shows the information flow between the K-Con client application 10 and the K-Con server application 11 during a "Keep Alive" procedure, by means of which the K-Con client application 10 communicates periodically its own presence to the K-Con server application 11, irrespective of whether the user uses the Internet connection. In particular:

the K-Con client application 10 declares itself active to the K-Con server application 11 by sending a KeepAlive message 100;
the K-Con server application 11 responds by sending an Info message 101 both to the K-Con client application 10 and to the Web server 12, the Info message 101 including all the above-mentioned information, i.e., the state of the broadband line, of the provisioning of the gateway, of the logic connection to the Internet, in addition to information on the profile configured, and possible other additional information;
the K-Con client application 10 continues to declare itself active to the K-Con server application 11 by periodically sending a KeepAlive message 100 at predetermined time intervals 102; and
the K-Con server application 11 responds to each KeepAlive message 100 by sending a corresponding Info message 101, whose information is displayed directly to the users by the K-Con client application 10, or via the standard internet browser 13.

The K-Con client application 10 will continue to periodically send the KeepAlive message 100 until there is a communication link with the gateway 3 and the K-Con client application 10 is running.

When the user terminals 2 connected to the local area network 4 are not provided with K-Con client applications 10, information workflow is identical to that shown in FIG. 2 since the embedded Web server 12 is functionally an emulator of the K-Con client applications 10, which emulator is no longer remote with respect to the gateway 3 but rather local. Consequently, by way of example, the Info message 101 is translated by the Web server 12 into a Info_html Web page according to the html presentation standard, and the translated message and its information contents are thus available to any type of user terminal 2 not provided with a K-Con client application 10 simply via a standard Internet browser 13 and the http protocol.

FIG. 2 shows also, with broken lines, the interaction of a user terminal 2 not provided with K-Con client application 10 but with a standard Internet browser 13. In particular:
the standard Internet browser 13 sends an http protocol request message 110 to the embedded Web server 12; and
the embedded Web server 12 responds with an http protocol response message 111 containing the html representation of all information that is included in the Info message 101.

FIG. 3 shows the information flow between the K-Con client application 10 and the K-Con server application 11 during a connection to the Internet. In particular:
the K-Con client application 10 sends to the K-Con server application 11' a request for connection to the Internet by sending an IConnOn message 103; the K-Con client application 10 sends this request only if the broadband line 6 is active, the provisioning process of the gateway 3 is completed, and the provisioned user profile is a pay-per-use type;
upon reception of the request for connection from the K-Con client application 10, if the connection to the Internet is not active, the K-Con server application 11 connects to the Internet 7 by using a connection protocol 106, 107 (e.g., PPPoE or PPPoA protocols are commonly used for broadband DSL connections);
when the connection to the Internet 7 is established, the K-Con server application 11 sends an Info message 101 both to the K-Con client application 10 and to the Web server 12; this Info message 101 reports to the K-Con client application 10 the new state of the connection to the Internet 7;
upon reception of the request for connection from the K-Con client application 10, if the connection to the Internet is already active, the K-Con server application 11 responds immediately by sending an Info message 101, both to the K-Con client application 10 and to the Web server 12;
the K-Con client application 10 continues to declare itself active to the K-Con server application 11 by periodically sending an IConnOn message 103 at predetermined time intervals 102.

Finally, FIG. 4 shows the information flow between the K-Con client application 10 and the K-Con server application 11 during a disconnection from the Internet. In particular:
the K-Con client application 10 sends to the K-Con server application 11 a request for disconnection from the Internet by sending an IConnOff message 103; the K-Con client application 10 sends this request only if the provisioned user profile is a pay-per-use type;
in response to the request for disconnection from the K-Con client application 10, if no other user terminals 2 have requested a connection to the Internet 7, the K-Con server application 11 disconnects from the Internet by using messages of a connection protocol (108, 109);
the K-Con server application 11 responds to the request for disconnection by sending an Info message 101 both to the K-Con client application 10 and to the Web server 12;
additionally the K-Con server application 11 automatically closes any connection to the Internet that may still be active when, after an adequate time interval 105, it has not received any IConnOn message 103 from any K-Con client application 10.

In general, workflow of messages, interactions and significant events can be of a different type with different communication protocols. By way of example, the following two possible variants of the logic of request and publication of information are cited:
use of multicast mechanisms: the K-Con client application 10 activates by registering in the multicast group of the gateway 3, and then information (Info message) is published by the gateway 3 through multicast messages; in this case, the keep-alive mechanism is prompted by the K-Con server application 11 by means of a request, sent to the multicast group, for renewal of the membership to the multicast group (and hence received by all multicast group components); and
use of notification mechanisms: the K-Con client application 10 uses the IConnOn message 103 to activate the connection, and registers itself in order to receive from the K-Con server application 11 the Info messages 101, which are sent only if the state of the connection to the Internet 7 changes to communicate the new state; when the state of the connection is "active", after a pre-set period of time, the K-Con server application 11 independently changes the state of the connection into "pending disconnect", and informs each registered K-Con client application 10 that the connection to the Internet 7 is about to be deactivated by sending to the K-Con client applications 10 the Info message 101; then, the K-Con client applications 10 that are interested in maintaining the connection to the Internet 7 active, respond by sending a IConnOn message 103 (request for connection), thus making K-Con server application 11 to change the connection state to "active".

The advantages of the present invention are evident from the foregoing. In particular, it is emphasized that the present invention allows the customer to be automatically provided, with a visual indication of the completion of the configuration of the gateway 3, and of the availability of the connection to the Internet 7 in a concise and aggregate manner, without the user having to be concerned with complex indications of network parameters.

Finally, it is clear that numerous modifications and variants can be made to the present invention, all falling within the scope of the invention, as defined in the appended claims. For example, although the above description considers the initial provisioning to a gateway of configuration parameters for Internet connection, the invention can be applied also to the case of gateway reconfiguration. For example, an ISP can proceed, e.g., through a gateway remote management system, to a change or update of one or more of the configuration parameters of a single gateway or of a plurality of gateways servicing its users, e.g., in case of changes to the user subscription or to the ISP access network. The invention can be applied also to the case of gateway reconfiguration, using the same procedures described above for the case of an initial gateway configuration.

The invention claimed is:

1. A method for managing an internet connection and informing a user about connectivity to an internet of a user terminal via a gateway, said gateway being connected to said user terminal via a first communication link, and to an internet service provider via a second communication link, comprising:
provisioning said gateway with initial configuration parameters for activating the internet connection for the user terminal according to a service profile subscribed to by the user across said first communication link;
during the provisioning of said gateway for activating the internet connection for the user terminal, providing said user terminal with a progress state about the provisioning of the gateway, said progress state including an indication of availability of connectivity of said gateway to the internet according to the service profile subscribed to by the user,
wherein said indication is automatically provided to said user terminal by said gateway without receiving a request from said user terminal;
receiving, at predetermined intervals during the provisioning of said gateway for activating the internet connection for the user terminal, a keep alive signal from the user terminal; and
in response to the keep alive signal from the user terminal, providing said user terminal with an updated progress state about the provision of the gateway.

2. The method of claim 1, further comprising:
determining a state of said second communication link; and
said indication of availability of connectivity to the internet according to the service profile subscribed to by the user includes the state of said second communication link.

3. The method of claim 2, wherein the state of said second communication link is determined by said gateway.

4. The method of claim 1, further comprising:
periodically updating said indication of availability of connectivity to the internet.

5. The method of claim 1, further comprising:
determining a state of, and information about, a logic connection to the internet.

6. The method of claim 1, wherein completion of the provisioning of said gateway is determined by said gateway.

7. The method of claim 1, wherein providing said user terminal with the progress state that includes the indication of the availability of the connectivity to the internet comprises:
receiving, by said gateway, a presence message sent from said user terminal; and
in response to said presence message, sending an information message from said gateway to said user terminal, said information message comprising information about a state of said second communication link, about the provisioning of said gateway, and about a logic connection to the internet.

8. The method of claim 1, wherein said user terminal is registered with a multicast group associated with said gateway, and wherein providing said user terminal with the progress state that includes the indication of the availability of the connectivity to the internet comprises:

sending an information message from said gateway to said multicast group, said information message comprising information about a state of said second communication link, about the provisioning of said gateway, and about a logic connection to the internet.

9. The method of claim 8, wherein providing said user terminal with the progress state that includes the indication of the availability of the connectivity to the internet further comprises:
sending a request for renewal of the membership to said multicast group from said gateway to said multicast group; and
receiving, by said gateway, a presence message sent from said user terminal in response to said request for renewal.

10. The method of claim 1, for a gateway provided with an embedded web server and the user terminal provided with an internet browser, wherein providing said user terminal with the progress state that includes the indication of the availability of the connectivity to the internet comprises:
receiving, by said gateway, an http protocol request message sent from said user terminal; and
sending an http protocol response message from said gateway to said user terminal, said http protocol response message containing an html representation of information about a state of said second communication link, about the provisioning of said gateway, and about a logic connection to the internet.

11. The method of claim 1, further comprising:
receiving, by said gateway, a request for connection to the internet sent from said user terminal;
in response to said request for connection, connecting said gateway to the internet, if the connection to the internet is not already active; and
sending an information message from said gateway to said user terminal, said information message comprising information about a state of said second communication link, about the provisioning of said gateway, and about a logic connection to the internet.

12. The method of claim 11, wherein said request for connection is received when said second communication link is active, and the provisioning of said gateway is completed.

13. The method of claim 11, wherein said information message is sent by said gateway when the connection to the internet is established.

14. The method of claim 11, wherein said information message is sent by said gateway upon reception of the request for connection from a client application running on said user terminal if the connection to the internet is already active.

15. The method of claim 11, wherein said information message is sent by said gateway only if a state of the connection to the internet changes.

16. The method of claim 11, further comprising:
a predetermined time interval after said gateway connects to the internet, sending a request for disconnection to the internet from said gateway to said user terminal; and
receiving, by said gateway, a request for connection to the internet sent from said user terminal in response to said request for disconnection.

17. The method of claim 1, further comprising:
receiving, by said gateway, a request for disconnection from the internet sent from said user terminal;
in response to said request for disconnection, disconnecting said gateway from the internet; and sending an information message from said gateway to said user terminal, said information message comprising information about a state of said second communication link, about the provisioning of said gateway, and about a logic connection to the internet.

18. The method of claim 17, wherein at least one further user terminal is connected to said gateway, and wherein said gateway disconnects from the internet only if no other user terminal has requested a connection to the internet.

19. The method of claim 17, wherein said request for disconnection is received when said gateway is connected to the internet.

20. The method of claim 19, further comprising:
automatically disconnecting said gateway from the internet if no request for connection to the internet is received from any user terminal for a predetermined time interval.

21. A system for managing an internet connection and informing a user about connectivity to an internet of a user terminal via a gateway, said gateway being connected to said user terminal via a first communication link, and to an internet provider via a second communication link, comprising the gateway and the user terminal capable of being configured to implement the method according to claim 1.

22. A customer-premises network comprising a user terminal and a gateway connected to said user terminal via a first communication link and to an internet service provider via a second communication link, said customer-premises network further comprising a system according to claim 21.

23. A non-transitory computer readable storage medium encoded with a software product loadable into the memory of at least one computer, said software product being run in a user terminal and a gateway connected to said user terminal and an internet service provider via a first communication link and a second communication link, respectively, said software product comprising software capable of cooperating in implementing the method according to claim 1.

* * * * *